US012191068B2

(12) United States Patent
Someya et al.

(10) Patent No.: US 12,191,068 B2
(45) Date of Patent: Jan. 7, 2025

(54) COIL DEVICE

(71) Applicant: TDK CORPORATION, Tokyo (JP)

(72) Inventors: Shuhei Someya, Tokyo (JP); Aoi Tokiwa, Tokyo (JP); Daisuke Urabe, Tokyo (JP)

(73) Assignee: TDK CORPORATION, Tokyo (JP)

( * ) Notice: Subject to any disclaimer, the term of this patent is extended or adjusted under 35 U.S.C. 154(b) by 492 days.

(21) Appl. No.: 17/079,669

(22) Filed: Oct. 26, 2020

(65) Prior Publication Data

US 2021/0166862 A1 Jun. 3, 2021

(30) Foreign Application Priority Data

Nov. 29, 2019 (JP) ................................ 2019-216223

(51) Int. Cl.

| | |
|---|---|
| ***H01F 27/29*** | (2006.01) |
| ***H01F 27/06*** | (2006.01) |
| ***H01F 27/24*** | (2006.01) |
| ***H01F 27/28*** | (2006.01) |
| ***H01F 41/069*** | (2016.01) |

(52) U.S. Cl.

CPC ......... *H01F 27/2828* (2013.01); *H01F 27/06* (2013.01); *H01F 27/24* (2013.01); *H01F 41/069* (2016.01)

(58) Field of Classification Search

CPC ...... H01F 27/2828; H01F 27/06; H01F 27/24; H01F 3/10; H01F 2027/065; H01F 17/045; H01F 27/29; H01F 27/292

See application file for complete search history.

(56) References Cited

U.S. PATENT DOCUMENTS

| | | | | |
|---|---|---|---|---|
| 2002/0021201 | A1* | 2/2002 | Oi | H01F 17/045 336/197 |
| 2016/0240304 | A1* | 8/2016 | Hirai | H01F 27/2823 |
| 2016/0365191 | A1* | 12/2016 | Horie | H01F 27/292 |
| 2017/0229232 | A1* | 8/2017 | Takagi | H01F 27/306 |
| 2017/0288626 | A1* | 10/2017 | Kobayashi | H01F 27/006 |
| 2017/0345557 | A1* | 11/2017 | Igarashi | H01F 5/06 |
| 2018/0068781 | A1* | 3/2018 | Igarashi | H01F 27/2828 |
| 2018/0097327 | A1 | 4/2018 | Murakami et al. | |
| 2018/0342346 | A1* | 11/2018 | Hashimoto | H01F 27/292 |
| 2020/0098511 | A1* | 3/2020 | Mikogami | H01F 27/292 |
| 2020/0279685 | A1* | 9/2020 | Yamamoto | H01F 27/292 |

FOREIGN PATENT DOCUMENTS

| | | |
|---|---|---|
| JP | H11-26254 A | 1/1999 |
| JP | 2003-234218 A | 8/2003 |
| JP | 2018-056399 A | 4/2018 |

* cited by examiner

*Primary Examiner* — Mang Tin Bik Lian
(74) *Attorney, Agent, or Firm* — Oliff PLC

(57) ABSTRACT

A coil device includes a winding core, a flange, and a terminal fitting. The winding core is wound by a wire. The flange is formed at an end of the winding core in its axial direction. The terminal fitting is attached to the flange. The terminal fitting includes an engagement part engaged with a circumferential wall part of the flange.

8 Claims, 15 Drawing Sheets

COIL DEVICE

BACKGROUND OF THE INVENTION

The present invention relates to a winding-type coil device.

As a winding-type coil device, for example, a coil device shown in Patent Document 1 is known. In the coil device of Patent Document 1, terminal fittings are attached to flanges, a lead end of a wire is connected to the terminal fittings, and the coil device can be mounted on a board via the terminal fittings. In the coil device of Patent Document 1, however, the terminal fittings are fixed to the flanges only via adhesive and may come off from the flanges when the board vibrates or deforms after mounting.

Patent Document 1: JP2018056399 (A)

BRIEF SUMMARY OF INVENTION

The present invention has been achieved under such circumstances. It is an object of the invention to provide a coil device capable of improving the reliability of fixation between a terminal fitting and a flange.

To achieve the above object, a coil device according to the present invention includes:

a winding core wound by a wire;

a flange formed at an end of the winding core in its axial direction; and a terminal fitting attached to the flange, wherein the terminal fitting includes an engagement part engaged with a circumferential wall part of the flange.

In the coil device according to the present invention, the terminal fitting includes an engagement part engaged with a circumferential wall part of the flange. Since the engagement part is engaged with the circumferential wall part of the flange, the terminal fitting can firmly be fixed to the flange and is hard to come off from the flange even if a board (a board for mounting the coil device) vibrates or deforms after mounting. Thus, the coil device according to the present invention can improve the reliability of fixation between the terminal fitting and the flange.

Preferably, the engagement part includes a pair of clamping pieces, and the pair of clamping pieces clamps the circumferential wall part of the flange from outside. In this structure, the engagement strength of the engagement part for the flange can be increased, and the terminal fitting can be fixed to the flange more firmly.

Preferably, the pair of clamping pieces clamps an inner end surface and an outer end surface of the flange from a side of the flange. In this structure, the terminal fitting can be fixed to the side of the flange, the coil device can be prevented from being larger due to the attachment of the terminal fitting, and the low profile of the coil device can be achieved.

Preferably, the terminal fitting includes a protrusion plate part including a wire connection surface to which a lead end of the wire is connected and a main mounting surface located opposite to the wire connection surface and being connectable to an external circuit. In this structure, the connection surface and the main mounting surface are substantially close to each other only with the thickness of the protrusion plate part, and it is possible to extremely reduce a DC resistance of the terminal fitting from the connection part of the lead end of the wire to an external circuit and to extremely reduce a DC resistance of the coil device as a whole. Thus, the coil device according to the present invention can also favorably be used for power supply applications.

Even when the coil device according to the present invention is used for signal system applications, the increase in insertion loss (IL) can be restrained, and the coil device according to the present invention can also favorably be used for signal system applications.

Preferably, the protrusion plate part includes a mounting base part extending in parallel to the external circuit and a tip bending part bending in turn back manner at a tip of the base part, and the lead end of the wire is sandwiched between the mounting base part and the tip bending part. When the lead end of the wire is sandwiched between the tip bending part and the mounting base part, the lead end is easily connected to the terminal fitting.

Preferably, the protrusion plate part includes a connection base part connecting the engagement part and the mounting base part. In this structure, a stress generated by vibration, deformation, etc. of the board can be reduced (absorbed) via the connection base part, and it is possible to effectively prevent the terminal fitting from coming off from the flange. In addition, when the connection base part is disposed between the engagement part and the mounting base part, the engagement part and the mounting base part can be separated from each other, and the above-mentioned reduction effect on the stress can be obtained effectively.

Preferably, a slit is formed near the engagement part. In this structure, a stress generated by vibration, deformation, etc. of the board can be prevented from traveling to the engagement part or so, and it is possible to effectively prevent the terminal fitting from coming off from the flange.

Preferably, the terminal fitting is narrow at a location of the slit. In this structure, the above-mentioned stress can effectively be prevented from traveling at the location of the slit, and the reduction effect of the slit can be enhanced.

Preferably, the flange is partly contacted with a rear surface of the terminal fitting located opposite to an external circuit. In this structure, the terminal fitting can be supported from behind by a part of the flange, and it is possible to prevent the deformation of the terminal fitting due to a stress generated by vibration, deformation, or the like of the board.

DETAILED DESCRIPTION OF INVENTION

Hereinafter, the present invention is explained based on the embodiments shown in the figures.

First Embodiment

Figure 1A:
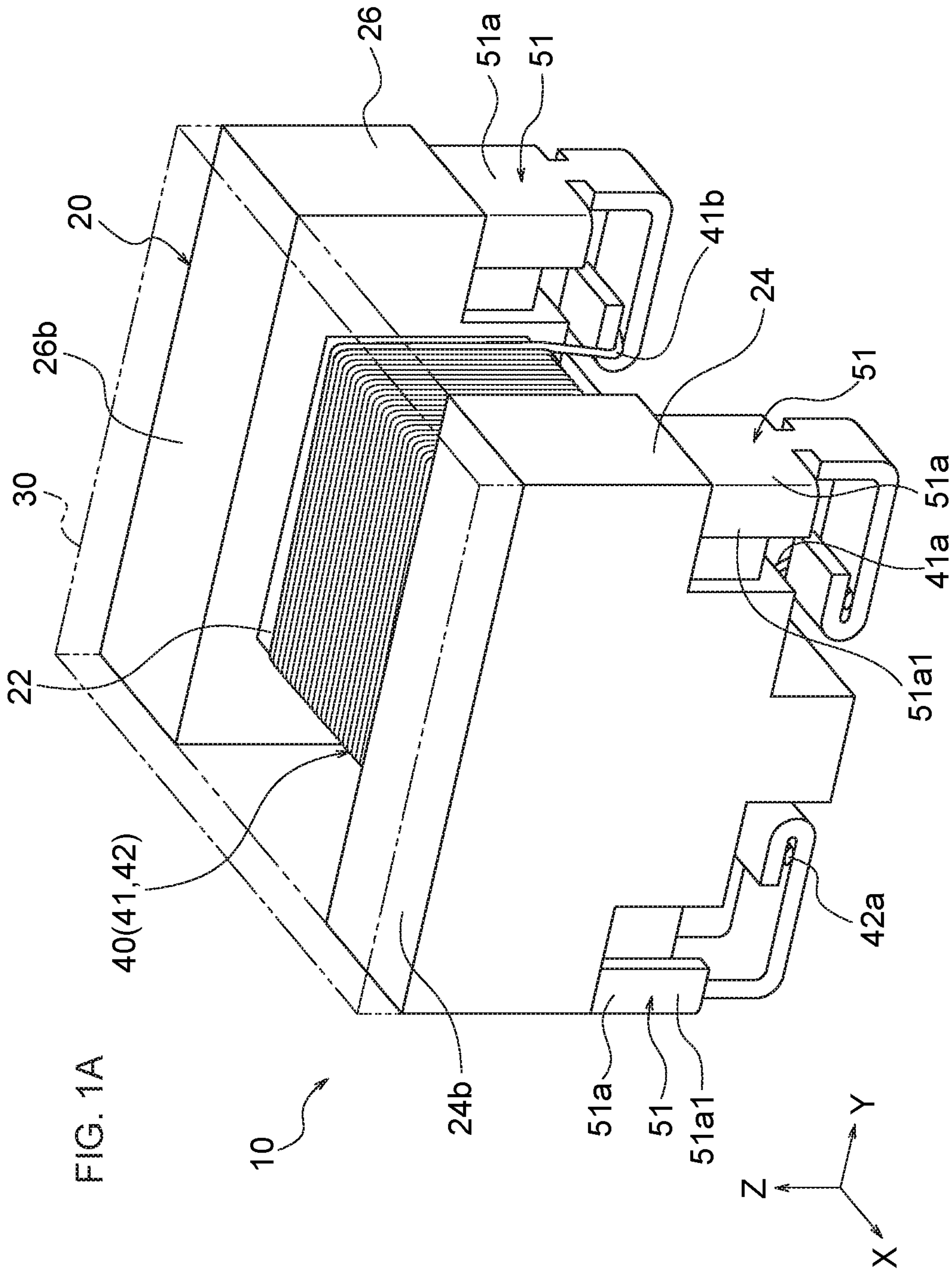
FIG. 1A is a perspective view of a coil device according to First Embodiment of the present invention.

A coil device 10 according to First Embodiment of the present invention shown in FIG. 1A is used for any purposes and is used as, for example, a winding-type common mode filter. The coil device 10 can also be used as a balun, a dual inductor, etc.

The coil device 10 includes a drum core 20, a coil unit 40 wound around a winding core 22 of the drum core 20, and a flat plate-like member 30 disposed on the drum core 20. In the explanation of the coil device 10, the X-axis direction is a direction parallel to a main mounting surface for the coil device 10 and to the winding axis of the winding core 22 of the drum core 20, the Y-axis direction is a direction parallel to the main mounting surface as similarly to the X-axis and perpendicular to the X-axis, and the Z-axis is a normal direction of the main mounting surface.

Figure 2A:
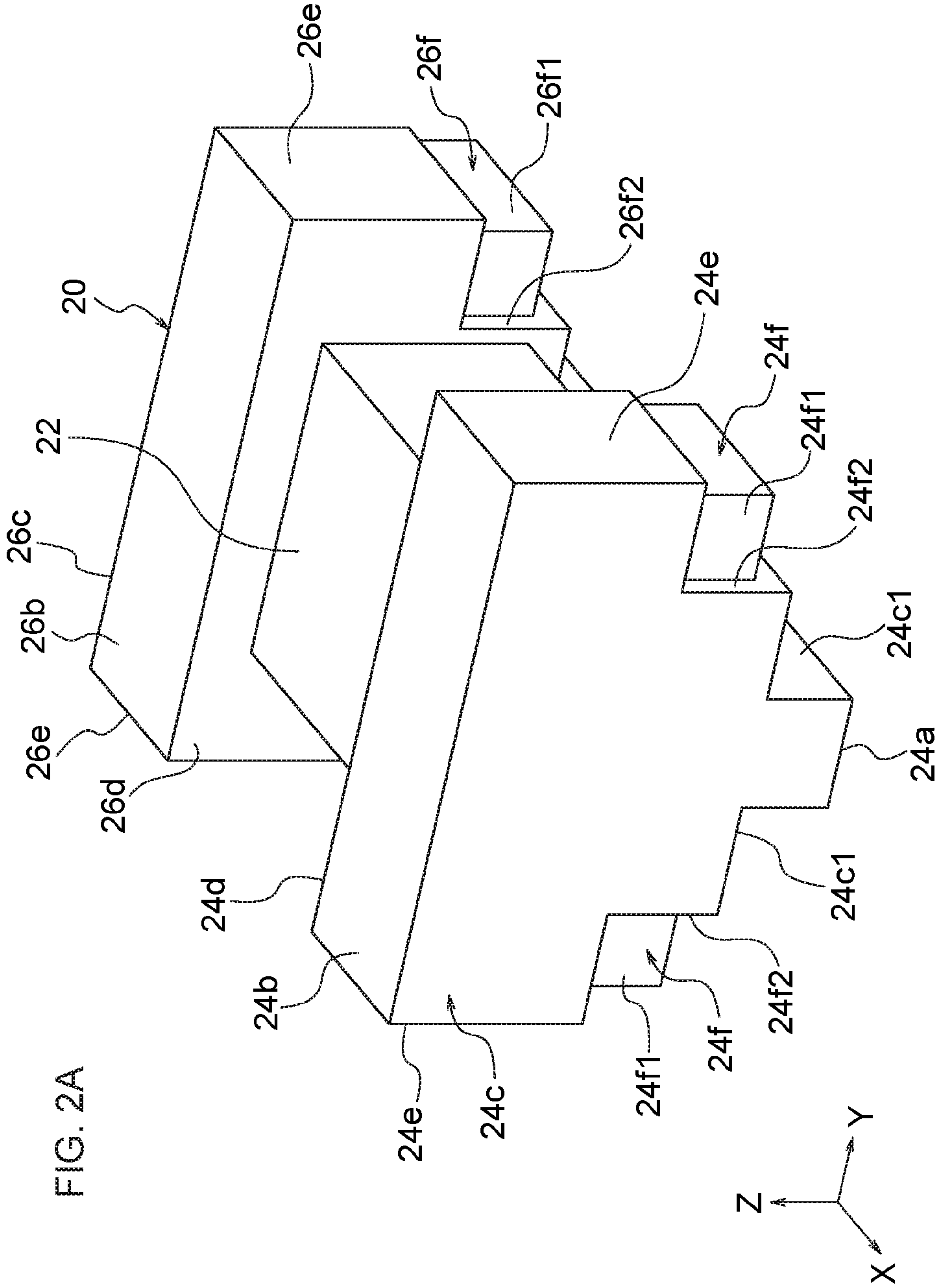
FIG. 2A is a perspective view of a drum-type core of the coil device shown in FIG. 1A.
Figure 2B:
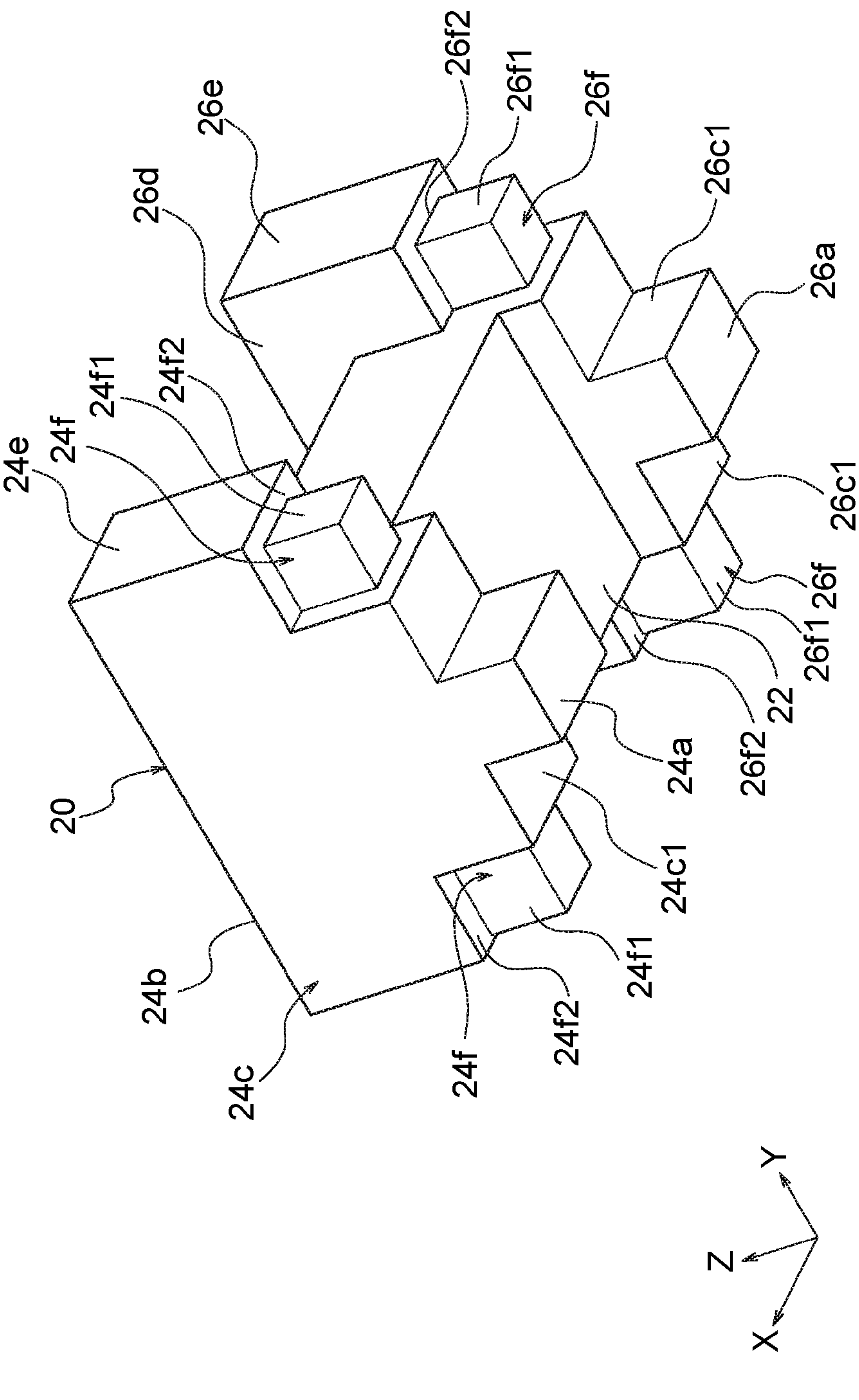
FIG. 2B is a perspective view of the drum-type core shown in FIG. 2A from below.

As shown in FIG. 2A and FIG. 2B, the drum core 20 includes the winding core 22 having a bar shape extending in the X-axis direction and a first flange 24 and a second flange 26 as a pair of core ends arranged on both ends of the winding core 22. The first flange 24 and the second flange 26 have substantially the same shape and are arranged in the winding core 22 so as to substantially be parallel to each other with a predetermined space in the X-axis direction.

The winding core 22 is connected to a substantially central area of each of surfaces of the pair of flanges 24 and 26 facing each other and is integrated with the pair of flanges 24 and 26. In the present embodiment, the winding core 22 has a rectangular cross-sectional shape, but may have any cross-sectional shape, such as circular.

Preferably, a plate-like member 30 shown in FIG. 1A is attached to an upper end of the drum core 20 in the Z-axis direction. Preferably, the plate-like member 30 is attached to an anti-mounting-side core surface 24*b* of the first flange 24 and an anti-mounting-side core surface 26*b* of the second flange 26 so as to bridge these anti-mounting-side core surfaces.

In the present embodiment, as shown in FIG. 2A and FIG. 2B, the first flange 24 is structured by a substantially rectangular parallelepiped as a whole, and notches 24*c*1 and notches (steps) 24*f*2 are formed at lower parts (or central parts) of the substantially rectangular parallelepiped shape on both sides in the Y-axis direction. The first flange 24 includes a mounting-side core surface 24*a* (lower surface in the Z-axis direction), the anti-mounting-side core surface 24*b* located opposite to the mounting-side core surface 24*a*, an outer end surface 24*c* in the X-axis direction, an inner surface (inner end surface) 24*d* facing the winding core 22, a pair of lateral surfaces 24*e* and 24*e* located opposite to each other in the Y-axis direction, and a pair of step surfaces 24*f* and 24*f* formed at central parts on both sides in the Y-axis direction.

Figure 1B:
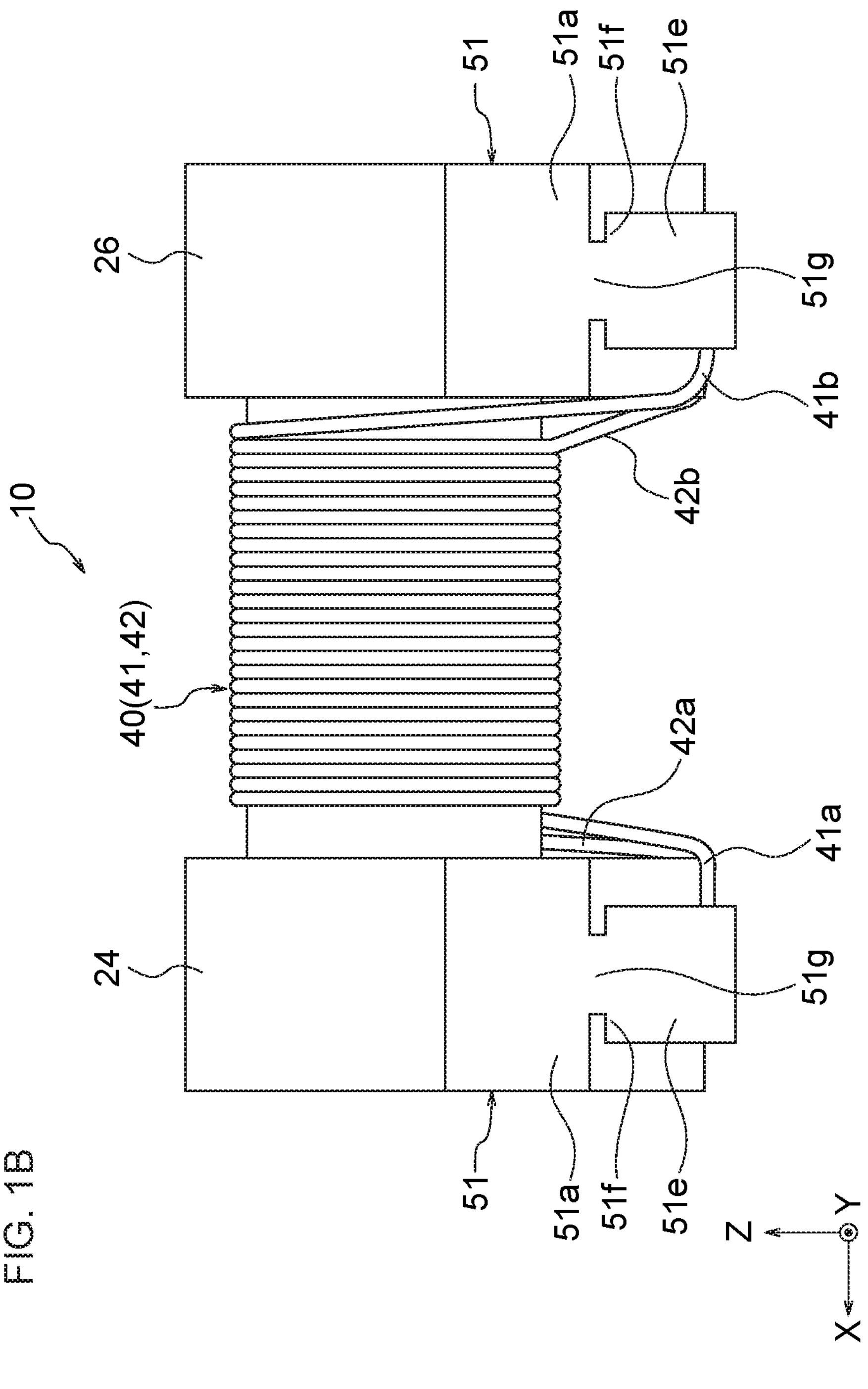
FIG. 1B is a lateral view of the coil device shown in FIG. 1A.
Figure 1C:
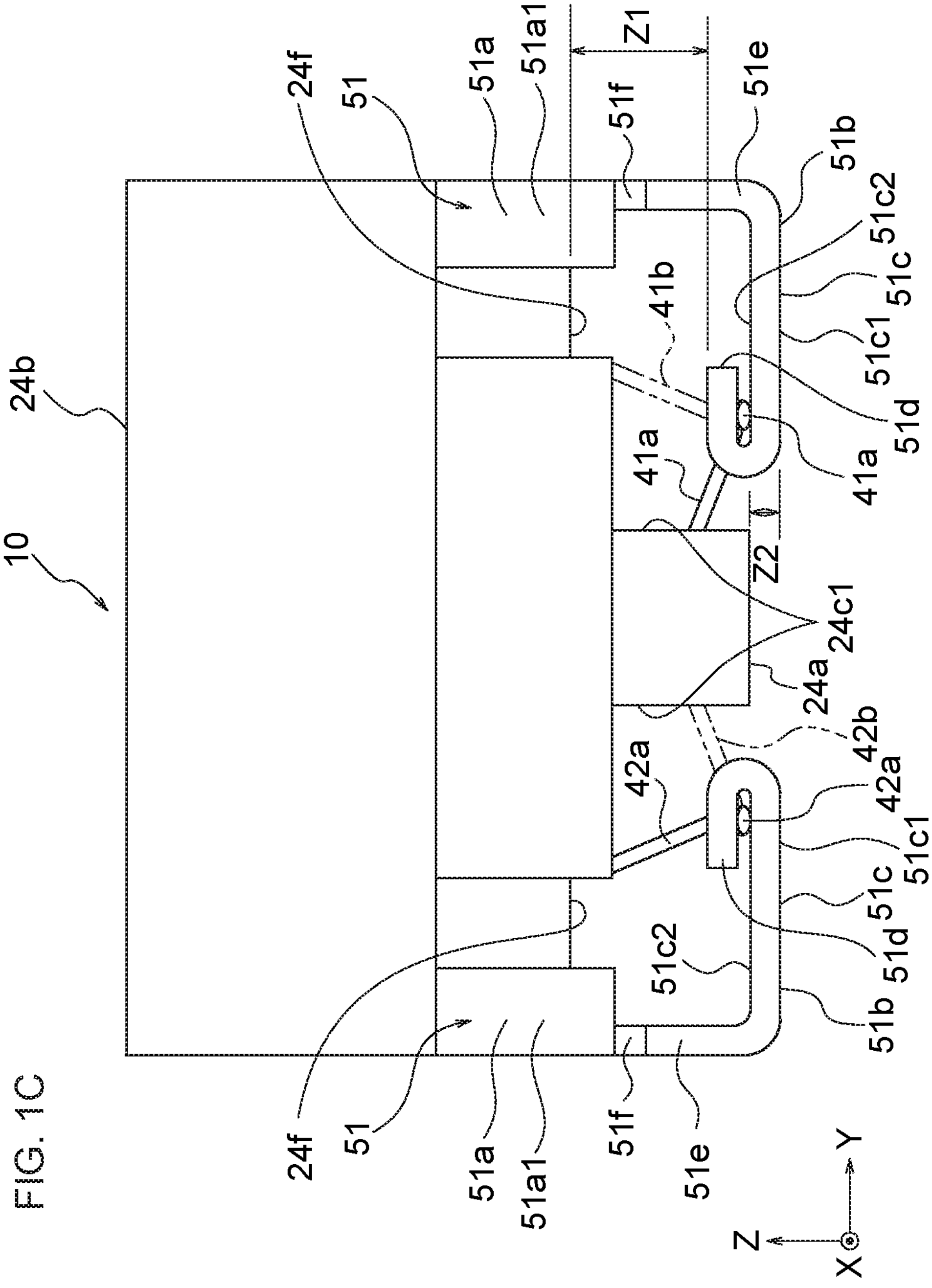
FIG. 1C is a front view of the coil device shown in FIG. 1A.

The notches 24*c*1 are formed on the outer end surface 24*c*. As shown in FIG. 1C, a protrusion plate part 51*b* of a terminal 51 can partly be disposed (contained) in each of the notches 24*c*1.

As shown in FIG. 2A and FIG. 2B, a terminal attachment surface 24*f*1 is formed on the step surfaces 24. The terminal attachment surface 24*f*1 is formed by forming the notches (steps) 24*f*2 on the outer end surface 24*c*, the inner surface 24*d*, and the lateral surfaces 24*e* and 24*e*. The terminal attachment surface 24*f*1 of the outer end surface 24*c* and the inner surface 24*d* is dented inward in the X-axis direction (toward the central part of the flange 24 in the X-axis direction), and the terminal attachment surface 24*f*1 of the lateral surfaces 24*e* is dented toward the inner side of the flange 24 in the Y-axis direction (toward the central part of the flange 24 in the Y-axis direction). The step depth of the terminal attachment surface 24*f*1 dented from the outer end surface 24*c* and the inner surface 24*d* toward the inner side in the X-axis direction is preferably as large as a plate thickness of the terminal 51 (engagement part 51*a*) shown in FIG. 3, but may be smaller or larger than the plate thickness. This is also the case with the step depth of the terminal attachment surface 24*f*1 dented from the lateral surfaces 24*e* and 24*e* toward the inner side in the Y-axis direction.

Incidentally, each surface constituting the terminal attachment surface 24*f*1 is regarded as a part of the outer end surface 24*c*, the inner surface 24*d*, and the lateral surfaces 24*e*. Thus, the terminal attachment surface 24*f*1 is formed over the outer end surface 24*c*, the inner surface 24*d*, and the lateral surfaces 24*e*. The terminal attachment surface 24*f*1 is engaged with engagement parts 51*a* of the terminals 51 shown in FIG. 3. If necessary, the fixation of the engagement parts 51*a* to the terminal attachment surface 24*f*1 is reinforced by adhesion.

Figure 3:
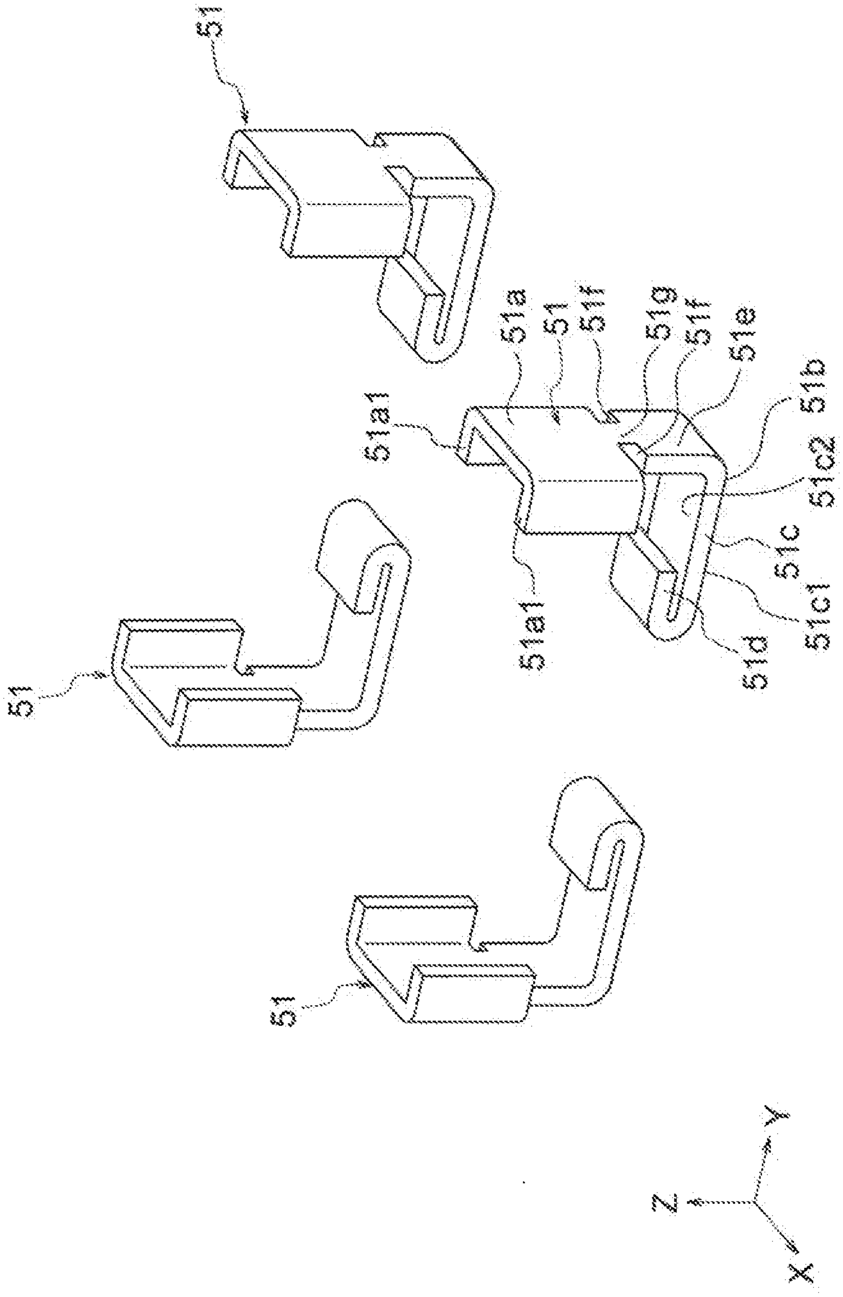
FIG. 3 is a perspective view of a terminal metal fitting of the coil device shown in FIG. 1A.

As shown in FIG. 3, each of the terminals 51 is structured by a conductive terminal plate or so and includes the engagement part 51*a* and the protrusion plate part 51*b* formed by bending a sheet of conductive plate-like member of a metal plate or so.

Each of the engagement part 51*a* has a substantially C shape and is engaged with the terminal attachment surface 24*f*1 formed on each of the step surfaces 24*f* shown in FIG. 2A and FIG. 2B. As shown in FIG. 1A, each of the engagement parts 51*a* is engaged with a circumferential wall part (peripheral part) of the flange 24 and is attached over a lateral part (lateral surface 24*e*), an inner part (inner surface 24*d*), and an outer part (outer end surface 24*c*) of the terminal attachment surface 24*f*1 shown in FIG. 2A and FIG. 2B. As shown in FIG. 1C, the lower ends of the engagement parts 51*a* in the Z-axis direction protrude from those of the step surfaces 24*f* and 24*f* in the Z-axis direction.

As shown in FIG. 3, each of the engagement parts 51*a* includes a pair of clamping pieces 51*a*1 and 51*a*1. The pair of clamping pieces 51*a*1 and 51*a*1 clamps a circumferential wall part of the flange 24 shown in FIG. 1A from outside. For more detail, the pair of clamping pieces 51*a*1 and 51*a*1 clamps the inner surface 24*d* and the outer end surface 24*c* of the flange 24 shown in FIG. 2A and FIG. 2B from the side of the flange 24 (surfaces on both sides of the terminal attachment surface 24*f*1 in the X-axis direction). The distance between the clamping pieces 51*a*1 and 51*a*1 in the X-axis direction is as large as or smaller than a width of the terminal attachment surface 24*f*1 in the X-axis direction.

Figure 8:
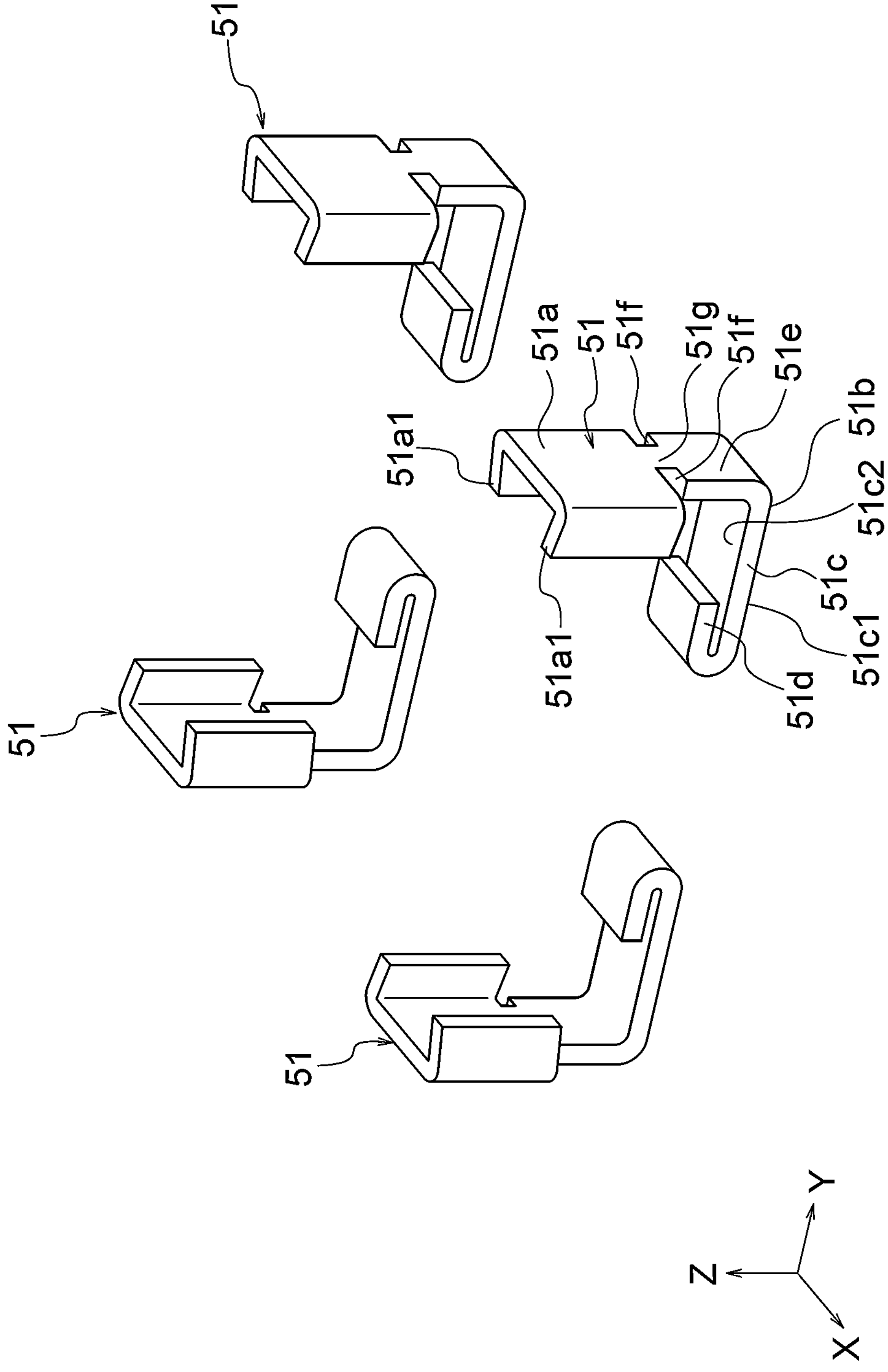
FIG. 8 is a perspective view showing a modification of the terminal fitting shown in FIG. 3.

In the example of FIG. 3, the distance between the pair of clamping pieces 51*al* and 51*al* in the X-axis direction is constant in the protrusion direction of the pair of clamping pieces 51*al* and 51*a*1, but may be smaller toward the tips of the pair of clamping pieces 51*al* and 51*a*1. This structure (refer to FIG. 8) can increase the clamping strength of the clamping pieces 51*al* and 51*al* for the terminal attachment surface 24*f*1 (the engagement strength of the engagement parts 51*a* for the terminal attachment surface 24*f*1).

In the present embodiment, the thickness part of the flange 24 in its thickness direction (X-axis direction) shown in FIG. 2A and FIG. 2B is clamped by the pair of clamping pieces 51*a*1 and 51*a*1 shown in FIG. 3 from the ends of the flange 24 (lateral ends), and the engagement parts 51*a* can thereby be engaged with the terminal attachment surface 24*f*1. The length of the pair of clamping pieces 51*a*1 and 51*a*1 in its longitudinal direction (protrusion length) is not limited as long as the lateral part of the terminal attachment surface 24*f*1 (lateral surface 24*e*) can be clamped.

Each of the protrusion plate parts 51*b* has a substantially L shape and extends downward in the Z-axis direction from the lower end of each of the engagement parts 51*a* in the Z-axis direction. In addition, each of the protrusion plate parts 51*b* is formed by bending in the Y-axis direction and protrudes toward the inner side of the flange 24 in the Y-axis direction.

Each of the protrusion plate parts 51*b* includes a mounting base part 51*c* extending in parallel to an external circuit board (not shown), a tip bending part 51*d* bending in turn back manner at the tip of the mounting base part 51*c*, and a connection base part 51*e* formed integrally with the lower end of each of the engagement parts 51*a* in the Z-axis direction and extending downward in the Z-axis direction.

The connection base part 51*e* functions as a leaf spring-like support and integrally connects the engagement part 51*a* and the mounting base part 51*c*. Even if an external circuit board (not shown) connected to the main mounting surface 51*c*1 bends or vibrates due to external force, thermal deformation, or the like, the deformation of the connection base part 51*e* absorbs the deformation (force) or the vibration and can effectively protect the coil device 110.

A pair of slits 51*f* and 51*f* is formed near the boundary between the engagement part 51*a* and the connection base part 51*e* (near the engagement part 51*a*). Each of the pair of slits 51*f* and 51*f* is made of a groove dented toward the inner side of the connection base part 51*e* in its width direction (X-axis direction). The terminal 51 is narrow in the X-axis direction at a location of the pair of slits 51*f* and 51*f*. A narrow part 51*g* is formed in the connection base part 51*e* at the location with a small width in the X-axis direction (between the pair of slits 51*f* and 51*f*). Preferably, the width of the narrow part 51*g* in the X-axis direction is ¼-¾ of the width of the connection base part 51*e* in the X-axis direction where the narrow part 51*g* is not formed.

The mounting base part 51*c* is formed integrally with the lower end of the connection base part 51*e* in the Z-axis direction and extends toward the inner side of the flange 24 in the Y-axis direction. For more detail, as shown in FIG. 1C, each of the mounting base parts 51*c* protrudes toward the inner side of the flange 24 in the Y-axis direction in the space formed below the notches 24*c*1 and the step surfaces 24*f*. The mounting base parts 51*c* are substantially perpendicular to the connection base parts 51*e* and extend substantially in parallel to the anti-mounting-side core surface 24*b*.

As shown in FIG. 3, the tip bending part 51*d* bends upward in the Z-axis direction and turns back at the tip of the mounting base parts 51*c*, the outer surface of the mounting base part 51*c* located opposite to the tip bending part 51*d* is a main mounting surface 51*c*1, and the inner surface of the mounting base part 51*c*, which the tip bending part 51*d* is located, is a connection surface (wire connection surface) 51*c*2. A lead end 41*a* (42*a*, 41*b*, 42*b*) (lead portion) of the wire 41 (42) is connected to the connection surface 51*c*2. When the lead end 41*a* (42*a*, 41*b*, 42*b*) (lead portion) of the wire 41 (42) is being connected, the tip bending part 51*d* is bent in turn back manner toward one side in the Y-axis direction (outside the flange 24 in the Y-axis direction) and extends substantially in parallel to the mounting base part 51*c*. The main mounting surface 51*c*1 is located opposite to the connection surface 51*c*2 and is connected to an external circuit.

In the present embodiment, the lead end 41*a* (42*a*, 41*b*, 42*b*) (lead portion) of the wire 41 (42) is sandwiched between the mounting base part 51*c* and the tip bending part 51*d*. For more detail, as shown in FIG. 1C, the lead end 41*a* (one lead end) of the first wire 41 (one wire) constituting the coil unit 40 shown in FIG. 1B is sandwiched and caulked by the connection surface 51*c*2 of the mounting base part 51*c* and the tip bending part 51*d*. This is also the case with the lead ends 42*a*, 41*b*, and 42*b*. After the caulking, the terminal 51 and the lead end 41*a* of the wire 41 may be connected by soldering, laser welding, etc.

The main mounting surface 51*c*1 is connected to a circuit pattern of an external circuit board (not shown). The connection to the circuit pattern of the external circuit board is carried out in any manner, such as solder connection.

In the present embodiment, the second flange 26 has a similar structure to the first flange 24, but may not necessarily have the same structure. In the present embodiment, as shown in FIG. 2A and FIG. 2B, the second flange 26 is structured by a substantially rectangular parallelepiped as a whole, and notches 26*c*1 and notches (steps) 26*f*2 are formed at lower parts (or central parts) of the rectangular parallelepiped shape on both sides in the Y-axis direction. The second flange 26 includes a mounting-side core surface 26*a* (lower surface in the Z-axis direction), the anti-mounting-side core surface 26*b* located opposite to the mounting-side core surface 26*a*, an outer end surface 26*c* in the X-axis direction, an inner surface 26*d* facing the winding core 22, a pair of lateral surfaces 26*e* and 26*e* located opposite to each other in the Y-axis direction, and a pair of step surfaces 24*f* and 24*f* formed at central parts on both sides in the Y-axis direction.

The notches 26*c*1 are formed on the outer end surface 26*c*. The protrusion plate part 51*b* of the terminal 51 can partly be disposed (contained) in each of the notches 26*c*1 (see FIG. 1C).

As shown in FIG. 2A and FIG. 2B, a terminal attachment surface 26*f*1 is formed on step surfaces 26*f*. The terminal attachment surface 26*f*1 is formed by forming the notches (steps) 26*f*2 on the outer end surface 26*c*, the inner surface 26*d*, and the lateral surfaces 26*e* and 26*e*. The terminal attachment surface 26*f*1 of the outer end surface 26*c* and the inner surface 26*d* are dented inward in the X-axis direction (toward the central part of the flange 26 in the X-axis direction), and the terminal attachment surfaces 26*f*1 of the lateral surfaces 26*e* are dented toward the inner side of the flange 26 in the Y-axis direction (toward the central part of the flange 26 in the Y-axis direction). The step depth of the terminal attachment surface 26*f* dented from the outer end surface 26*c* and the inner surface 26*d* toward the inner side in the X-axis direction is preferably as large as a plate thickness of the terminal 51 (engagement part 51*a*) shown in FIG. 3, but may be smaller or larger than the plate thickness. This is also the case with the step depth of the terminal attachment surface 26*f* dented from the lateral surfaces 26*e* and 26*e* toward the inner side in the Y-axis direction.

Incidentally, each surface constituting the terminal attachment surface **26*f*1 is regarded as a part of the outer end surface 26*c*, the inner surface 26*d*, and the lateral surfaces 26*e*. Thus, the terminal attachment surface 26*f*1 is formed over the outer end surface 26*c*, the inner surface 26*d*, and the lateral surfaces 26*e*. The terminal attachment surface 26*f*1 is engaged with engagement parts 51*a* of the terminal 51 shown in FIG. 3. If necessary, the fixation of the engagement parts 51*a* to the terminal attachment surface 26*f*1** is reinforced by adhesion.

The attachment structure of the terminal 51 shown in FIG. 3 to the second flange 26 shown in FIG. 2A and FIG. 2B is similar to that to the first flange 24 shown in FIG. 2A and FIG. 2B mentioned above and is thereby not explained in detail.

Figure 1D:
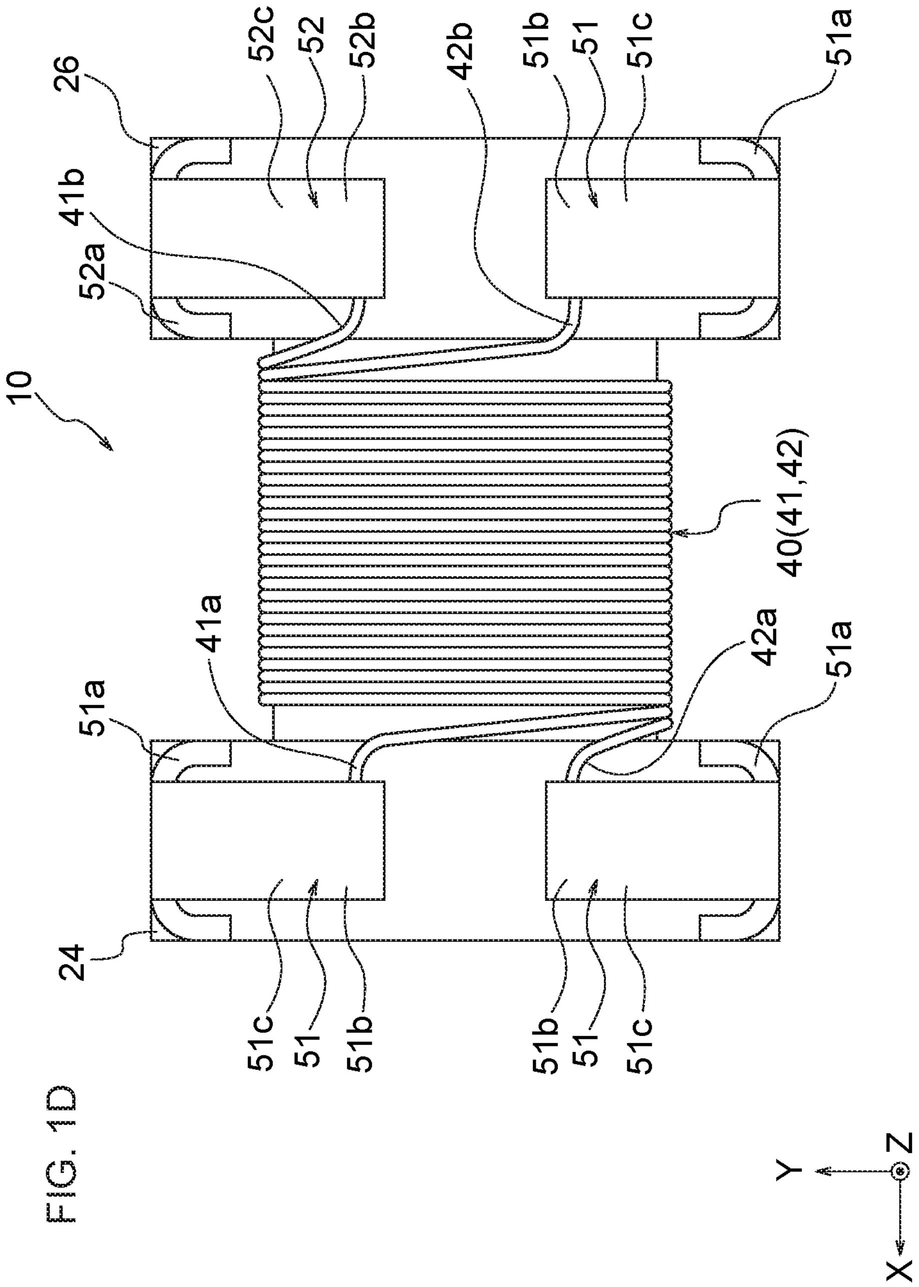
FIG. 1D is a bottom view of the coil device shown in FIG. 1A.

As shown in FIG. 1C, the lead ends **41*a* and 42*a* (one leading portions) of the wires 41 and 42 are connected to the connection surfaces 51*c*2 of the terminals 51. The lead ends 41*b* and 42*b* (the other leading portions) of the wires 41 and 42 shown in FIG. 1D are connected to the connection surfaces 51*c*2 of the terminals 51 on the back in the X-axis direction shown in FIG. 3. These are connected by any method, such as welding, resistance welding, ultrasonic welding, caulking, thermocompression bonding, and heat welding (preferably, laser welding, soldering, etc.). Incidentally, the four terminals 51 shown in FIG. 3** have a similar structure.

As shown in FIG. 1A, FIG. 1B, and FIG. 1D, the coil unit 40 is formed around the winding core 22 of the drum core 20. In the present embodiment, the coil unit 40 is structured by two wires 41 and 42. The wires 41 and 42 are structured by, for example, a coated wire formed by covering a core made of a good conductor (e.g., copper wire) with an insulating coverage film and are wound around the winding core 22, for example, in a double-layer structure. In the present embodiment, the cross-sectional areas of conductive parts of the wires 41 and 42 are the same as each other.

In the present embodiment, the first wire 41 and the second wire 42 are wound around the winding core 22 by a normal bifilar winding, but a cross part may be formed at a predetermined location in the winding axis of the winding core 22.

In the manufacture of the coil device 10, the four terminals 51 shown in FIG. 3 are initially attached to the drum core 20 shown in FIG. 2A and FIG. 2B. The terminals 51 are attached by engaging the engagement parts **51*a* of the terminals 51 with the terminal attachment surfaces 24*f*1 and 26*f*1 of the flanges 24 and 26. The engagement parts 51*a* are attached to the terminal attachment surfaces 24*f*1 and 26*f*1 by pushing the engagement parts 51*a* against the terminal attachment surfaces 24*f*1 and 26*f*1** from the outer side to the inner side in the Y-axis direction.

Prepared are the drum-type drum core 20 with the terminals 51 manufactured in such a manner, the flat plate-like member 30, and the wires 41 and 42. The drum core 20 is made of magnetic material and can be manufactured by, for example, pressing and sintering a magnetic material with a comparatively high permeability (e.g., Ni—Zn based ferrite, Mn—Zn based ferrite) or a magnetic powder composed of metal magnetic material or so. The flat plate-like member 30 is preferably made of the same or different magnetic material from the drum core 20, but is not necessarily made of magnetic material.

The terminals 51 are structured by a metal terminal made of phosphor bronze, tough pitch copper, pure copper, brass, silver, gold, metallic alloys with solder bondability, etc. Each of the terminals 51 has any thickness, but preferably has a thickness of 50-300 μm.

For example, the wires 41 and 42 can be formed by covering a core made of a good conductor of copper (Cu) or so with an insulating material made of imide-modified polyurethane or so and further covering the outermost surface with a thin resin film of polyester or so. The drum core 20 on which the terminals 51 are installed and the wires 41 and 42 are set to a winding machine, and the wires 41 and 42 are wound around the winding core 22 of the drum core 20 in a predetermined order. Each of the wires 41 and 42 has any diameter, but preferably has a diameter of 10-300 μm.

In the present embodiment, the first wire 41 and the second wire 42 are wound by bifilar winding. The lead ends **41*a*, 42*a*, 41*b*, and 42*b* of the lead portions (wire ends) of the wound wires 41 and 42 are connected after the tip bending part 51*d* is caulked to the connection surfaces 51*c*2 of the predetermined terminals 51 shown in FIG. 3**.

After the winding operation of the wires 41 and 42 to the winding core 22, the flat plate-like member 30 is connected to the anti-mounting-side core surfaces **24*b* and 26*b* of the flanges 24 and 26** by any method, such as adhesion.

In the coil device 10 according to the present embodiment, the wire length of the lead end **41*a* (one lead portion) of the first wire 41 from the coil unit 40 to the connection surface 51*c*2 of the terminal 51 and the wire length of the lead end 42*a* (one lead portion) of the second wire 42 from the coil unit 40 to the connection surface 51*c*2 of the terminal 51 are preferably substantially the same, but may be different from each other. Preferably, the winding number of the first wire 41 and the winding number of the second wire 42 in the coil unit 40** are the same as each other. This structure further improves mode conversion characteristics.

In the coil device 10 according to the present embodiment, each of the terminals 51 includes the engagement part **51*a* engageable with a circumferential wall part of the flange 24 (or the flange 26; the same applies hereinafter). Since the engagement part 51*a* is engaged with the circumferential wall part of the flange 24, the terminals 51 can firmly be fixed to the flange 24 and are hard to come off from the flange 24 even if an external circuit board vibrates or deforms after mounting. Thus, the coil device 10 according to the present embodiment can improve the reliability of fixation between the terminals 51 and the flange 24**.

In the present embodiment, each of the engagement parts **51*a* includes a pair of clamping pieces 51*a*1 and 51*a*1, and the pair of clamping pieces 51*a*1 and 51*a*1 clamps the circumferential wall part of the flange 24 from outside. Thus, the engagement strength of the engagement part 51*a* for the flange 24 can be increased, and the terminals 51 can be fixed to the flange 24 more firmly. Moreover, for example, since the pair of clamping pieces 51*a*1 and 51*a*1 does not clamp the mounting-side core surface 24*a* or the anti-mounting-side core surface 24*b* of the flange 24, but clamps parts of the flange 24 in its thickness direction (X-axis direction), these parts can strongly be clamped by the pair of clamping pieces 51*a*1 and 51*a*1**.

In the present embodiment, the pair of clamping pieces **51*a*1 and 51*a*1 clamps the inner surface (inner end surface) 24*d* and the outer end surface 24*c* of the flange 24 from the side of the flange 24. Thus, the terminals 51 can be fixed to the side of the flange 24, the coil device 10 can be prevented from being larger due to the attachment of the terminals 51, and the low profile of the coil device 10** can be achieved.

In the present embodiment, each of the terminals 51 includes a protrusion plate part **41*c* including: a connection surface (wire connection surface) 51*c*2** to which the lead end

41*a* (42*a*, 41*b*, 42*b*) (lead portion) of the wire 41 (42) is connected; and a main mounting surface 51*c*1 located opposite to the wire connection surface and being connectable to an external circuit. Thus, the connection surface 51*c*2 and the main mounting surface 51*c*1 are substantially close to each other only with the thickness of the protrusion plate part 51*b*, and it is possible to extremely reduce a DC resistance of each of the terminals 51 from the connection part of the lead end 41*a* (42*a*, 41*b*, 42*b*) (lead portion) of the wire 41 (42) to an external circuit and to extremely reduce a DC resistance of the coil device 10 as a whole. Thus, the coil device 10 according to the present embodiment can also favorably be used for power supply applications.

Even when the coil device 10 according to the present embodiment is used for signal system applications, the increase in insertion loss (IL) can be restrained, and the coil device 10 according to the present embodiment can also favorably be used for a high frequency signal system application of, for example, 100 MHz or more.

In the present embodiment, the protrusion plate part 51*b* includes: a mounting base part 51*c* extending in parallel to the external circuit; and a tip bending part 51*d* bending in turn back manner at a tip of the base part 51*c*, and the lead end 41*a* (42*a*, 41*b*, 42*b*) (lead portion) of the wire 41 (42) is sandwiched between the mounting base part 51*c* and the tip bending part 51*d*. When the lead end 41*a* (42*a*, 41*b*, 42*b*) (lead portion) of the wire 41 (42) is sandwiched between the tip bending part 51*d* and the mounting base part 51*c*, the lead end 41*a* (42*a*, 41*b*, 42*b*) is easily connected to the terminal 51.

In the present embodiment, the protrusion plate part 51*b* includes a connection base part 51*e* connecting the engagement part 51*a* and the mounting base part 51*c*. Thus, a stress generated by vibration, deformation, etc. of the board can be reduced (absorbed) via the connection base part 51*e*, and it is possible to effectively prevent the terminals 51 from coming off from the flange 24. In addition, when the connection base part 51*e* is disposed between the engagement part 51*a* and the mounting base part 51*c*, the engagement part 51*a* and the mounting base part 51*c* can be separated from each other, and the above-mentioned reduction effect on the stress can be obtained effectively.

In the present embodiment, a pair of slits 51*f* and 51*f* is formed near the engagement part 51*a*. Thus, a stress generated by vibration, deformation, etc. of the board can be prevented from traveling to the engagement part 51*a* or so, and it is possible to effectively prevent the terminals 51 from coming off from the flange 24.

In the present embodiment, each of the terminals 51 is narrow at a location of the pair of slits 51*f* and 51*f*. Thus, the above-mentioned stress can effectively be prevented from traveling at the location of the pair of slits 51*f* and 51*f*, and the reduction effect of the slits 51*f* and 51*f* can be enhanced.

In the present embodiment, as shown in FIG. 1C, a gap distance Z1 between the tip bending part 51*d* of the protrusion plate part 51*b* and the flange 24 (26) in the Z-axis direction perpendicular to the main mounting surface 51*c*1 is twice or larger than a thickness of the protrusion plate part 51*b* at a location where the lead end 41*a* (42*a*) of the wire 41 (42) is connected. In this structure, for example, the lead end 41*a* (42*a*) of the wire 41 (42) can easily be connected to the protrusion plate part 51*b* by laser welding, soldering, or the like. In addition, a thermal deformation stress of a circuit board (not shown) or so is hard to travel to the flanges, and the connection strength of the coil device 10 to the circuit board is improved.

In the present embodiment, as shown in FIG. 1C, the main mounting surfaces 51*c*1 of the mounting base parts 51*c* protrude downward in the Z-axis direction from the mounting-side core surface 24*a* by a predetermined distance Z2. Preferably, the predetermined distance Z2 is larger than zero and is about twice or less (more preferably, once or less) of the thickness of each of the plate-like members constituting the terminal 51.

In the present embodiment, as shown in FIG. 1A, the coil device 10 according to the present embodiment further includes a flat plate-like member 30 bridging the anti-mounting-side core surface 24*b* of the first flange 24 and the anti-mounting-side core surface 26*b* of the second flange 26. When the flat plate-like member 30 is made of magnetic material, a closed magnetic circuit can be formed by combination with the drum core 20 made of magnetic material, and magnetic characteristics of the coil device 10 are improved.

Incidentally, the plate-like member 30 may be a nonmagnetic member. In addition, the plate-like member 30 may be a member formed by application of resin. Preferably, such plate-like members 30 have a flat surface. A suction member for pickup can detachably be attached to the flat surface. This improves the handling performance.

Second Embodiment

A coil device according to Second Embodiment of the present invention is different from the coil device 10 according to First Embodiment only in the following structure and demonstrates effects similar to those of First Embodiment. The overlapping matters with First Embodiment are not explained. In the figures, common components with First Embodiment are given common references.

Figure 4:
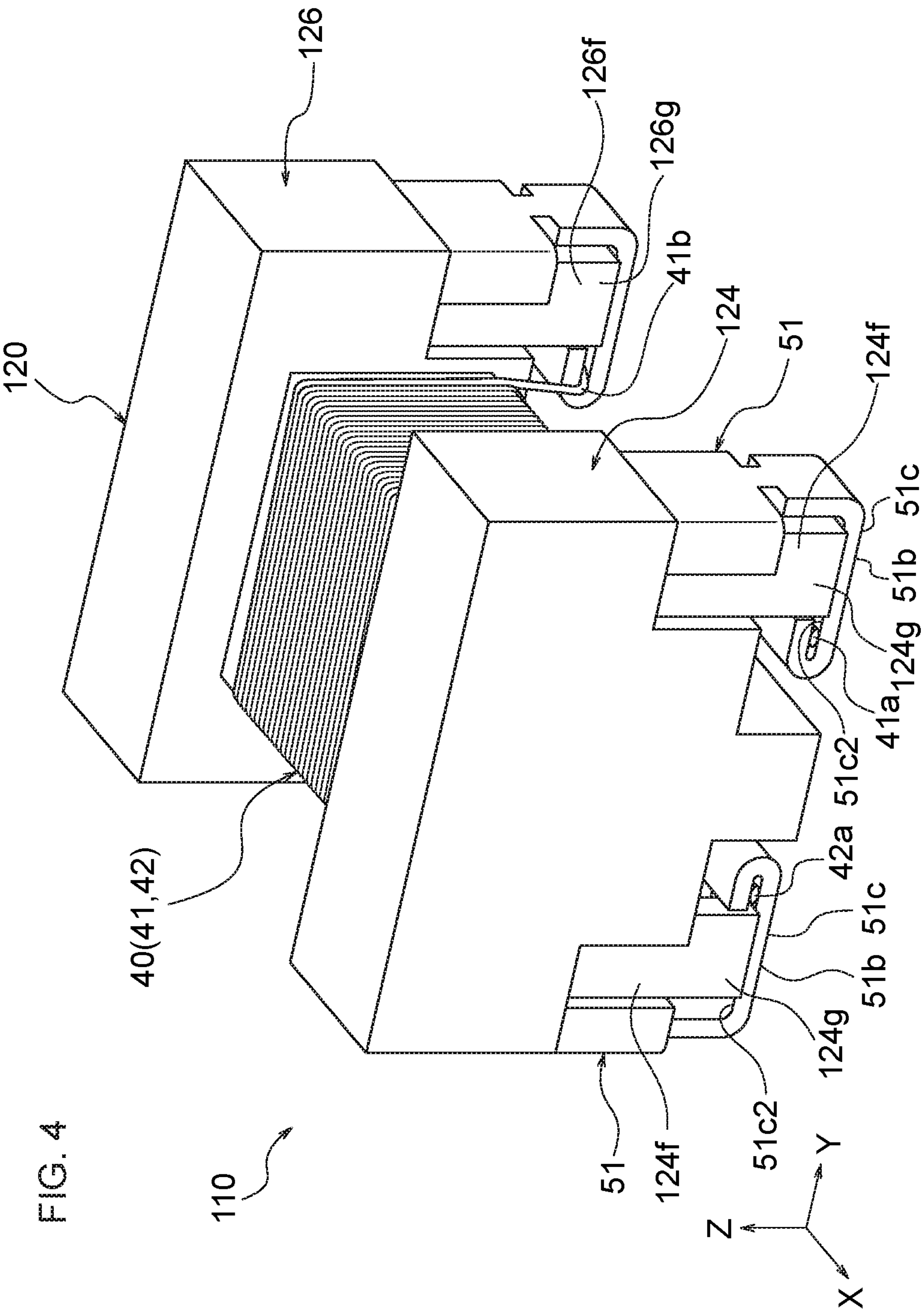
FIG. 4 is a perspective view of a coil device according to Second Embodiment of the present invention.

In a coil device 110 according to the present embodiment, as shown in FIG. 4, the core 20 of the coil device 10 according to First Embodiment shown in FIG. 1A to FIG. 1D is replaced with a core 120. The core 120 includes flanges 124 and 126. The flange 124 (126) includes protrusion parts 124*g* (126*g*).

The protrusion parts 124*g* (126*g*) constitute a part of the flange 124 (126) and protrude downward in the Z-axis direction. Each of the protrusion parts 124*g* (126*g*) includes a step surface 124*f* (126*f*). The step surfaces 124*f* (126*f*) are formed by extending the step surfaces 24*f* (26*f*) shown in FIG. 2A and FIG. 2B downward in the Z-axis direction.

Figure 5A:
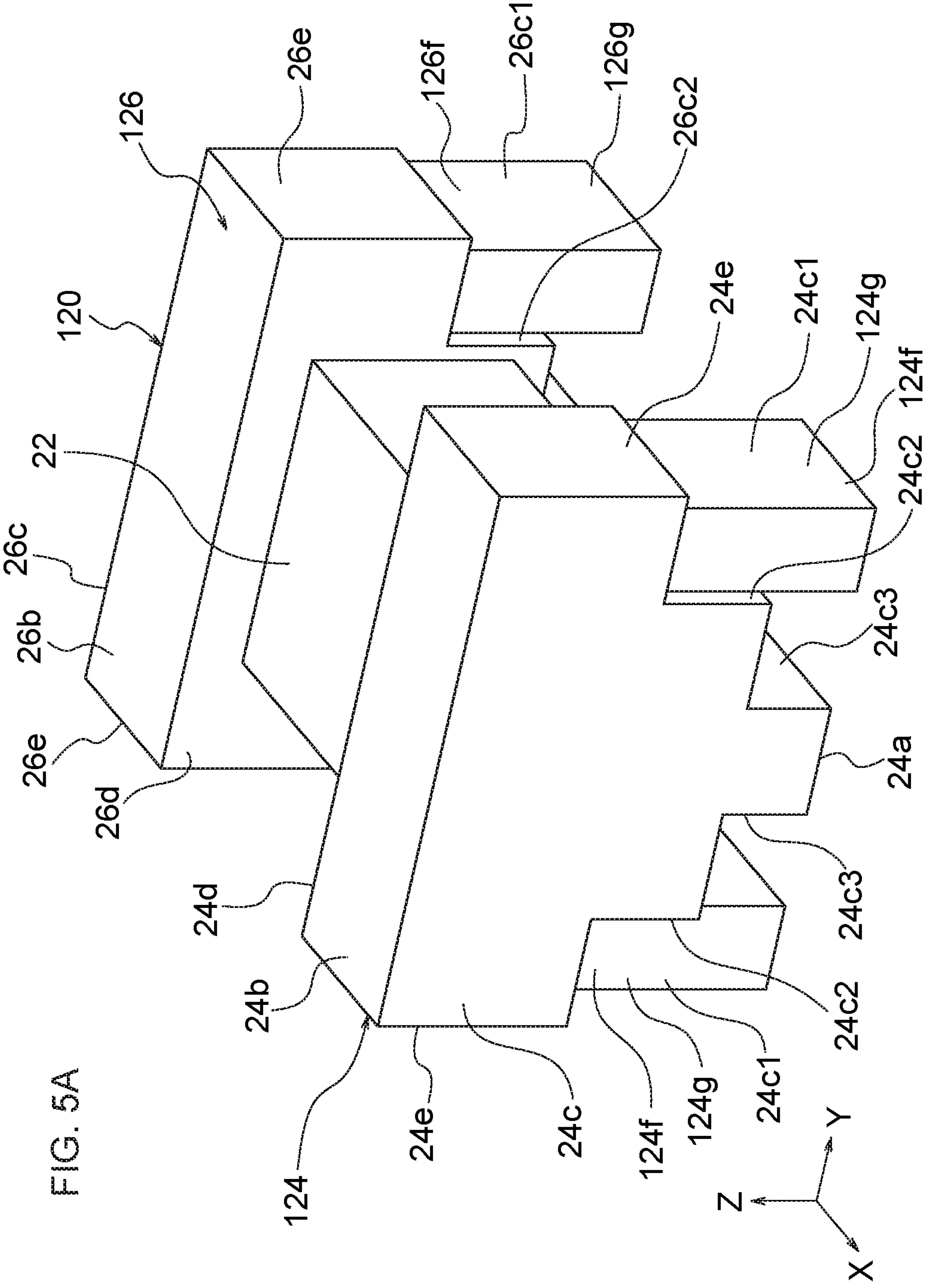
FIG. 5A is a perspective view of a drum-type core of the coil device shown FIG. 4.
Figure 5B:
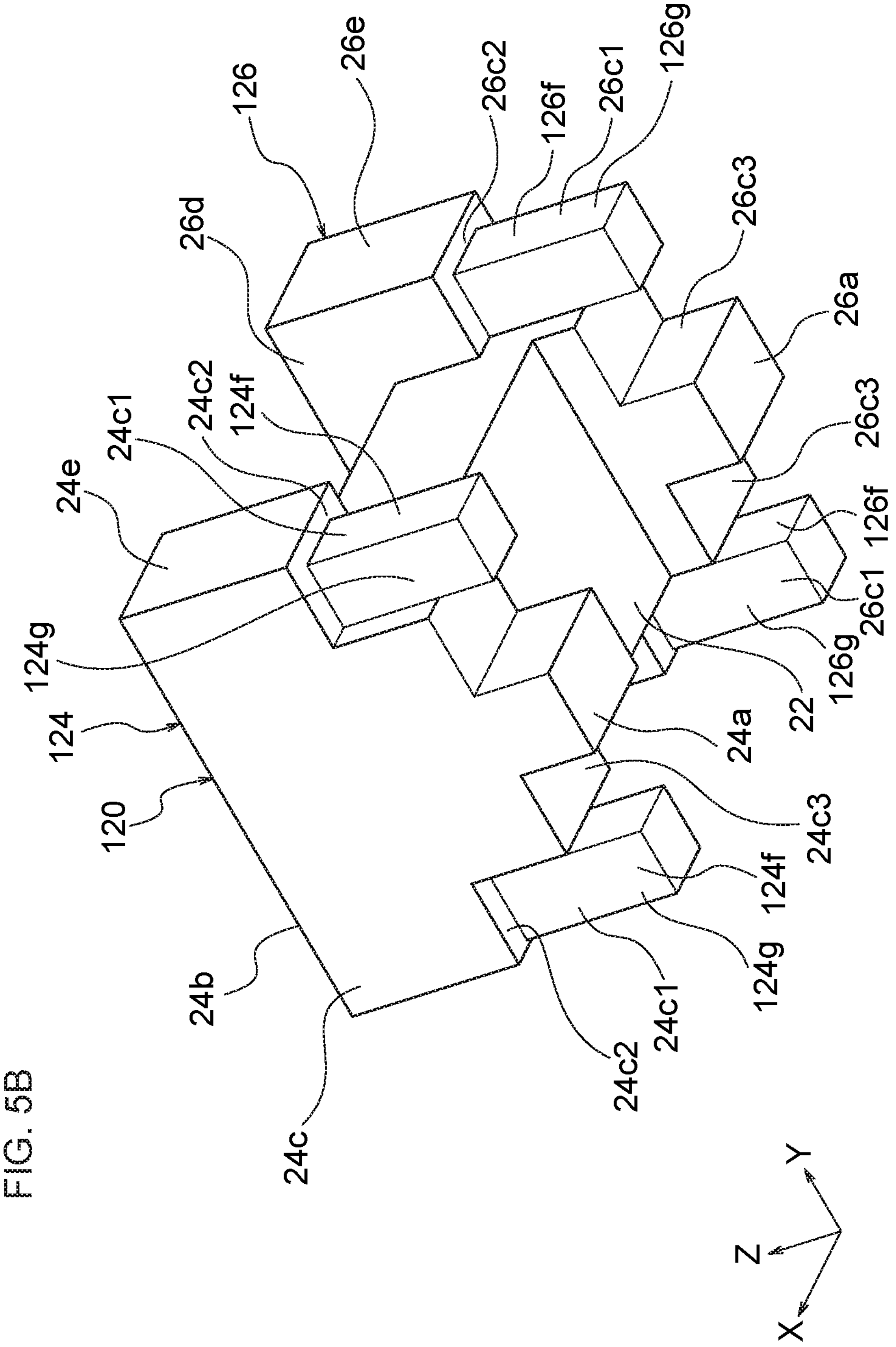
FIG. 5B is a perspective view of the drum-type core shown in FIG. 5A from below.

As shown in FIG. 5A and FIG. 5B, the lower ends of the protrusion parts 124*g* (126*g*) in the Z-axis direction are arranged at substantially the same location as the mounting-side core surface 24*a* (26*a*) of the flange 124 (126) or arranged above the mounting-side core surface 24*a* (26*a*) of the flange 124 (126). The protrusion parts 124*g* (126*g*) are contacted with rear surfaces (connection surfaces 51*c*2) of the terminals 51 located opposite to an external circuit board (not shown). Thus, the terminals 51 can be fixed to the protrusion parts 124*g* (126*g*) at least at two points (the engagement parts 51*a* and the connection surfaces 51*c*2).

In the present embodiment, the flange 124 (126) is partly (protrusion parts 124*g* (126*g*)) contacted with the rear surfaces (connection surfaces 51*c*2) of the terminals 51 located opposite to an external circuit board (not shown). Thus, the terminals 51 can be supported from behind by the protrusion parts 124*g* (126*g*), and it is possible to prevent the deformation of the terminals 51 due to a stress generated by vibration, deformation, or the like of an external circuit board (not shown).

Third Embodiment

A coil device according to Third Embodiment of the present invention is different from the coil device 10 according to First Embodiment only in the following structure and demonstrates effects similar to those of First Embodiment. The overlapping matters with First Embodiment are not explained. In the figures, common components with First Embodiment are given common references.

Figure 6A:
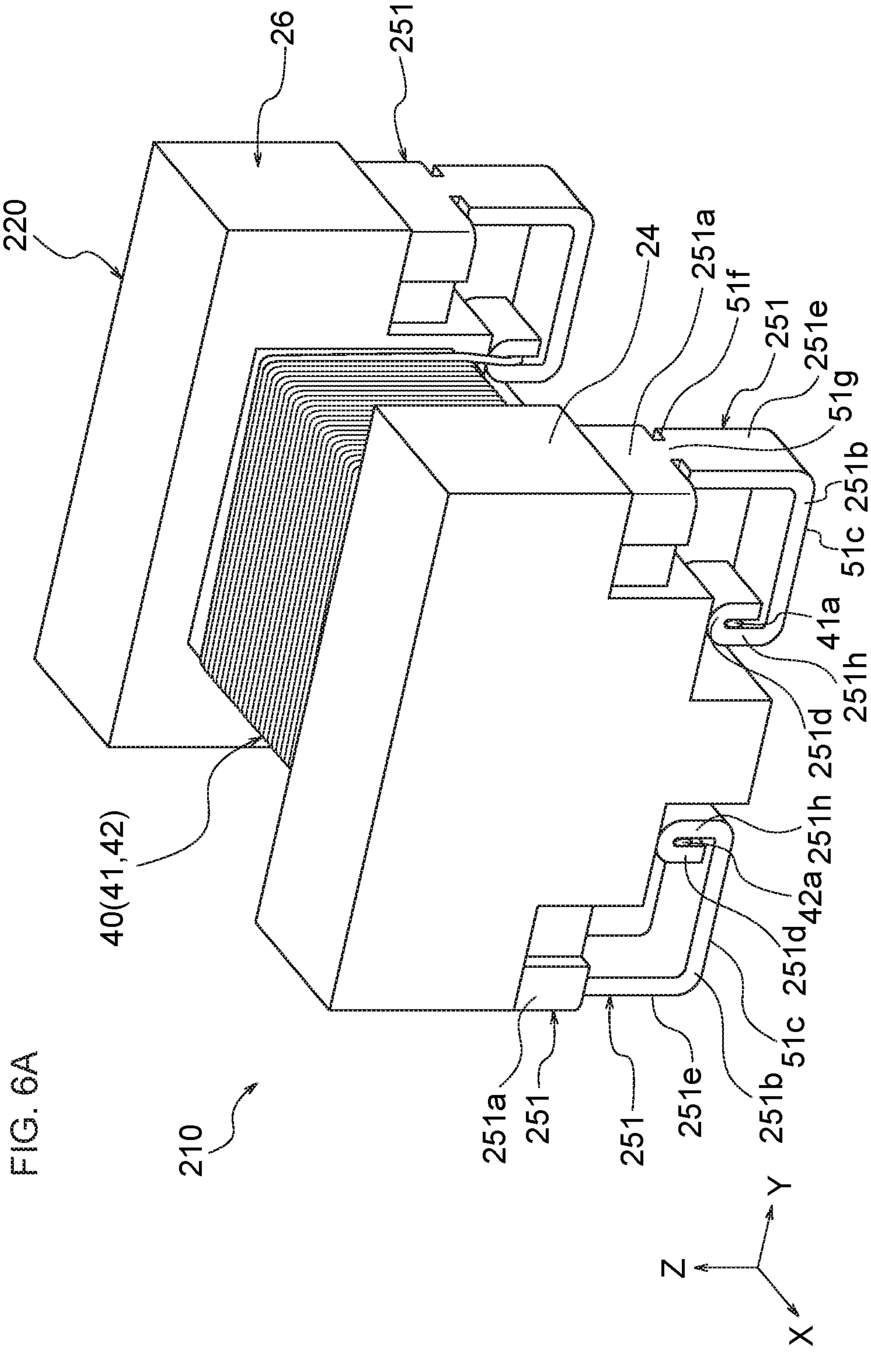
FIG. 6A is a perspective view of a coil device according to Third Embodiment of the present invention.

In a coil device 210 according to the present embodiment, as shown in FIG. 6, the terminals 51 of the coil device 10 according to First Embodiment shown in FIG. 1A to FIG. 1D are replaced with terminals 251. Each of the terminals 251 includes an engagement part 251*a* and a protrusion plate part 251*b*.

Figure 6B:
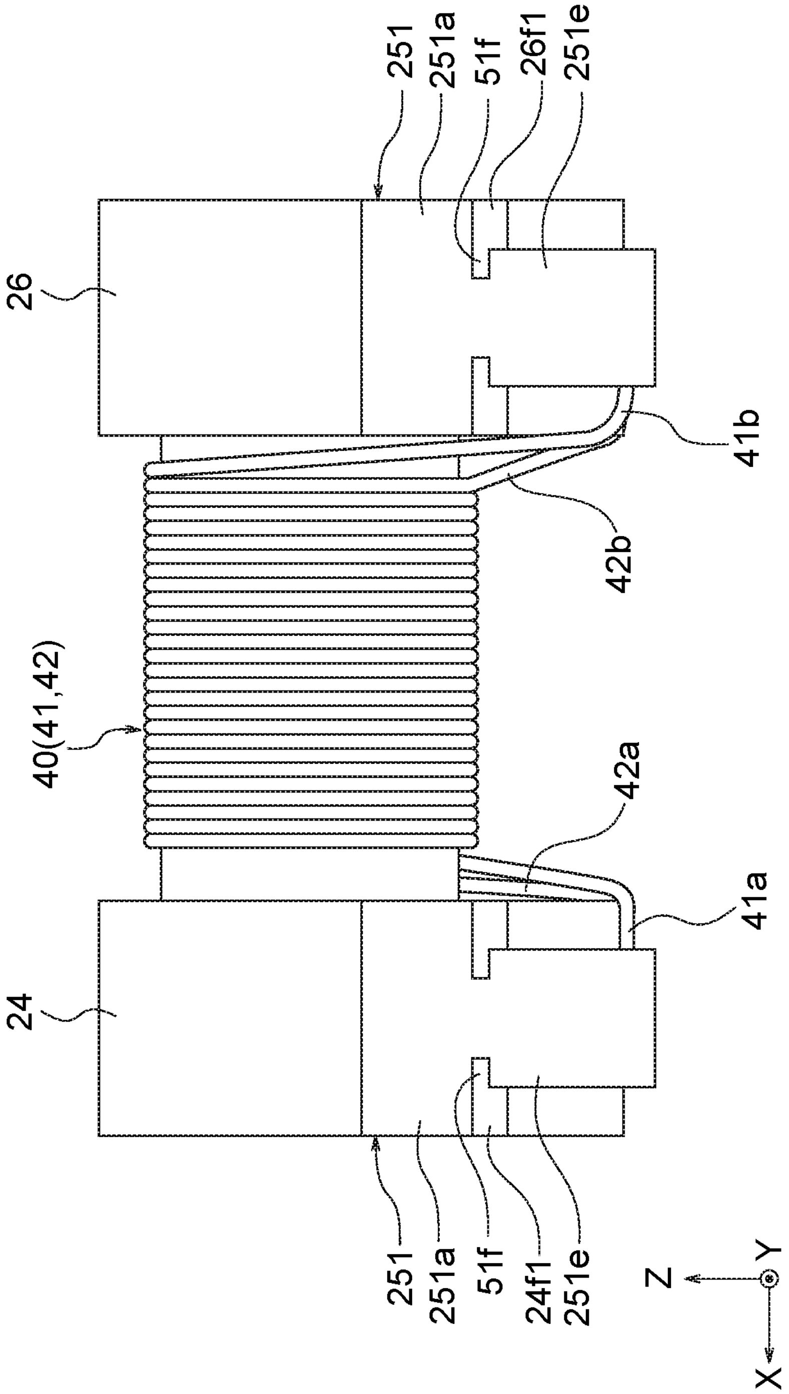
FIG. 6B is a lateral view of the coil device shown in FIG. 6A.
Figure 7:
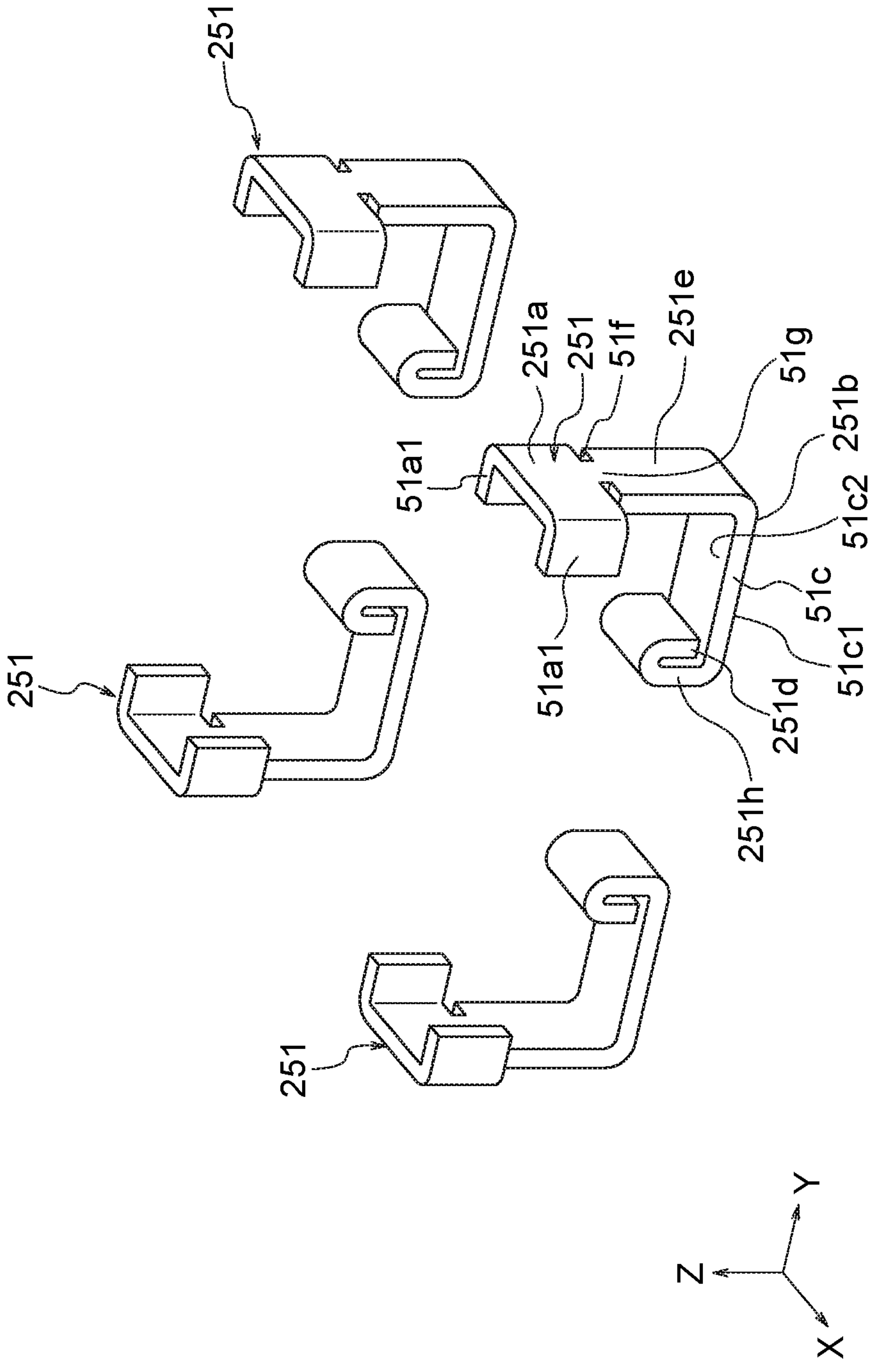
FIG. 7 is a perspective view of a terminal metal fitting of the coil device shown in FIG. 6A.

As shown in FIG. 7, the engagement parts 251*a* are different from the engagement parts 51*a* according to First Embodiment in that the length of the engagement parts 251*a* in the Z-axis direction is smaller than that of the engagement parts 51*a* shown in FIG. 3. As shown in FIG. 6B, the lower ends of the engagement parts 251*a* in the Z-axis direction do not protrude from those of the terminal attachment surfaces **24*f*1 (26*f*1) in the Z-axis direction, but are arranged on the inner sides of the lower ends of the terminal attachment surfaces 24*f*1 (26*f*1**) in the Z-axis direction.

The protrusion plate part 251*b* is different from the protrusion plate part 51*b* shown in FIG. 3 in that the protrusion plate part 251*b* includes a tip bending part 251*d*, a connection base part 251*e*, and a standing piece 251*h*. The connection base part 251*e* is different from the connection base part 51*e* in that the length of the connection base part 251*e* in the Z-axis direction is larger than that of the connection base part 51*e* according to First Embodiment in the Z-axis direction. The standing piece 251*h* is bent to stand upward in the Z-axis direction at the tip of the mounting base part 51*c*. In the illustrated example, the standing piece 251*h* stands substantially perpendicularly to the mounting base part 51*c*.

Figure 6C:
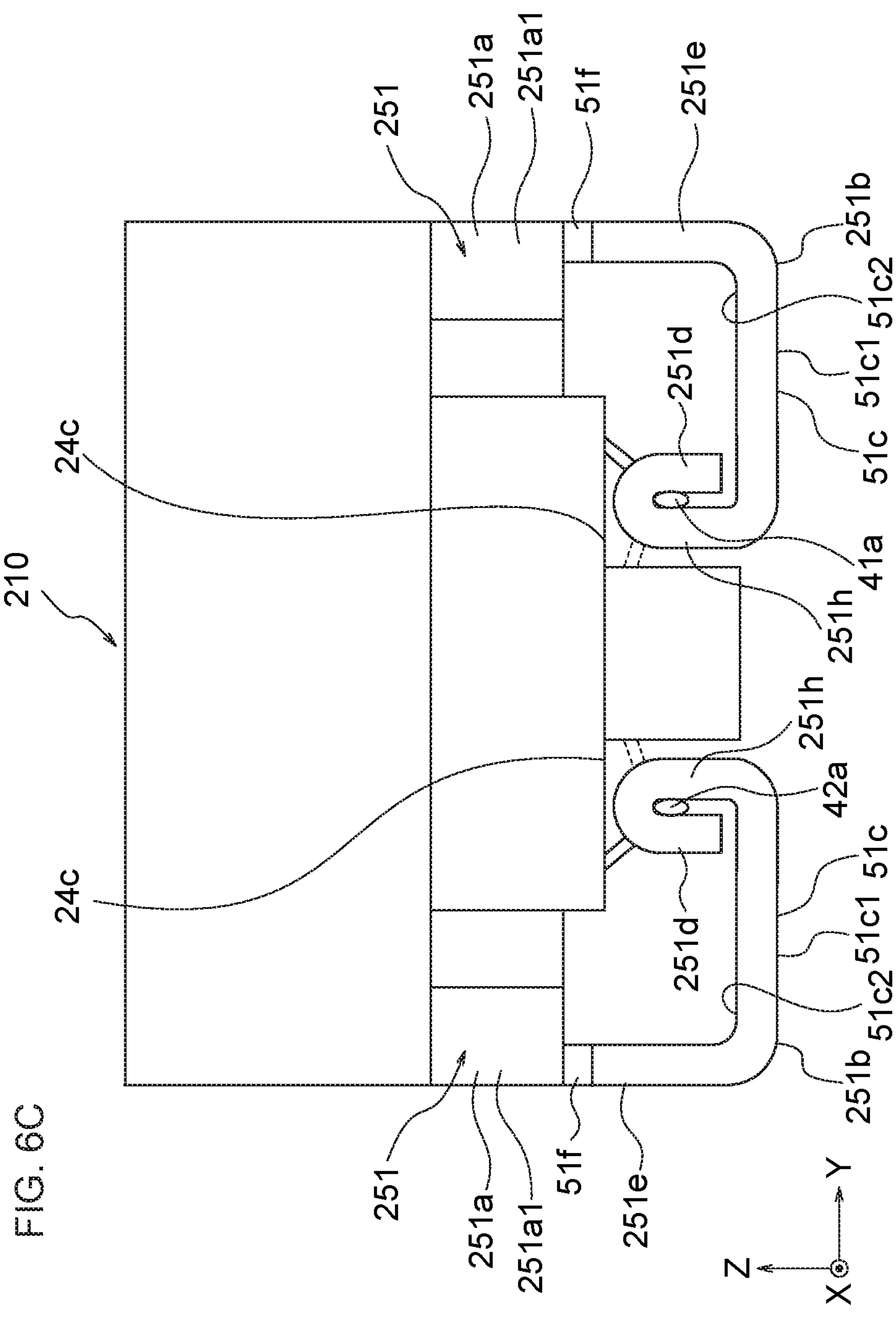
FIG. 6C is a front view of the coil device shown in FIG. 6A.

The tip bending part 251*d* is bent downward in the Z-axis direction at the tip of the standing piece 251*h* in the Z-axis direction. The tip bending part 251*d* extends substantially in parallel to the standing piece 251*h* and the connection base part 251*e*. The lead end 41*a* (42*a*, 41*b*, 42*b*) (lead portion) of the wire 41 (42) can be sandwiched between the standing piece 251*h* and the tip bending part 251*d*. As shown in FIG. 6C, the standing piece 251*h* and the tip bending part 251*d* sandwich the lead end 41*a* (42*a*, 41*b*, 42*b*) (lead portion) of the wire 41 (42) on the inner side of the notches 24*c* (26*c*) of the flange 24 (26).

Effects similar to those of First Embodiment are also obtained in the present embodiment. That is, the terminals 51 are hard to come off from the flange 24 (26) even if an external circuit board vibrates or deforms after mounting, and the reliability of fixation between the terminals 51 and the flange 24 (26) can be improved.

Incidentally, the present invention is not limited to the above-mentioned embodiments and can variously be modified within the scope of the present invention.

In the above-mentioned embodiments, for example, the first flange 24 and the second flange 26 have the same structure, but may have different structures. The notches 24*c*1 formed at the lower parts of the flange 24 (26) of the drum core 20 shown in FIG. 2A and FIG. 2*b* on both sides in the Y-axis direction may be wide in the Y-axis direction. For example, the notches 24*c*1 on both sides may be connected in the Y-axis direction.

In the above-mentioned embodiments, the engagement part 51*a* of the terminal 51 is engaged with the lateral surfaces 24*e* (26) of the flange 24 (26), but may be engaged with another part of the circumferential wall part of the flange 24 (26). For example, the engagement part 51*a* may be engaged with the anti-mounting-side core surface 24*b* (26*b*) of the flange 24 (26).

In the above-mentioned embodiments, the engagement parts 51*a* may directly be engaged with the lateral surfaces 24*e* (26) without forming the step surfaces 24*f* (26*f*). The main mounting surfaces 51*c* of the terminals 51 may be formed below the mounting-side core surface 24*a* (26*a*) of the flange 24 (26) in the Z-axis direction without forming the notches 24*c*1 (26*c*1).

In the above-mentioned embodiments, the connection base part 51*e* is not an essential component and may not be formed. In this case, the mounting base part 51*c* may be formed by bending the lower end of the engagement part 51*a* in the Z-axis direction to the Y-axis direction and protrude toward the inner side of the flange 24 in the Y-axis direction. In this case, if necessary, the lower end of the engagement part 51*a* in the Z-axis direction may be extended downward, or the engagement location of the engagement part 51*a* may be shifted downward in the Z-axis direction.

In Third Embodiment, the length of the engagement part 251*a* and the connection base part 251*e* in the Z-axis direction may be similar to that of the engagement part 51*a* and the connection base part 51*e* in the Z-axis direction according to First Embodiment.

In the above-mentioned embodiments, the pair of slits 51*f* and 51*f* is structured by forming a pair of grooves on both sides of the terminal 51 in the X-axis direction, but the slits 51*f* and 51*f* may be structured by, for example, forming a linear groove (a groove extending in the X-axis direction) connecting between one end and the other end in the X-axis direction on the surface of the terminal 51.

In the above-mentioned embodiments, the clamping strength of the pair of clamping pieces 51*a*1 and 51*a*1 for the terminal attachment surface **24*f*1 (26*f*1) may be improved by providing projections on the inner surfaces of the pair of clamping pieces 51*a*1 and 51*a*1 or further providing recesses being engageable with the projections on the terminal attachment surface 24*f*1 (26*f*1**).

DESCRIPTION OF THE REFERENCE NUMERICAL

10, 110, 210 . . . coil device
20, 120 . . . drum core
22 . . . winding core
24, 124 . . . first flange
24*a* . . . mounting-side core surface
24*b* . . . anti-mounting-side core surface
24*c* . . . outer end surface
24*c*1 . . . notch
24*d* . . . inner surface
24*e* . . . lateral surface
24*f* . . . step surface
**24*f*1** . . . terminal attachment surface
**24*f*2** . . . notch
124*g* . . . protrusion part
26 . . . second flange
26*a* . . . mounting-side core surface
26*b* . . . anti-mounting-side core surface
26*c* . . . outer end surface
26*c*1 . . . notch
26*d* . . . inner surface

**26*e*** . . . lateral surface
**26*f*** . . . step surface
**26*f*1** . . . terminal attachment surface
**26*f*3** . . . notch
**126*g*** . . . protrusion part
30 . . . flat plate-like member
40 . . . coil unit
41 . . . first wire
**41*a*** . . . one lead portion (lead end)
**41*b*** . . . the other lead portion (lead end)
42 . . . second wire
**42*a*** . . . one lead portion (lead end)
**42*b*** . . . the other lead portion (lead end)
51, 251 . . . terminal (terminal fitting)
**51*a*, 251*a*** . . . engagement part
**51*a*1, 251*a*1** . . . clamping piece
**51*b*, 251*b*** . . . protrusion plate part
**51*c*** . . . mounting base part
**51*c*1** . . . main mounting surface
**51*c*2** . . . connection surface (wire connection surface)
**51*d*, 251*d*** . . . tip bending part
**51*e*, 251*e*** . . . connection base part
**51*f*** . . . slit
**51*g*** . . . narrow part
**251*h*** . . . standing piece

What is claimed is:

1. A coil device comprising:

a winding core (i) wound by a wire, (ii) having a winding core axis that is a longitudinal axis of a winding of the wire on the winding core and (iii) having a first end surface at an end of the winding core along the winding core axis;

a flange having (i) an inner end surface connected to the first end surface, (ii) an outer end surface spaced from and opposite to the inner end surface, (iii) a lateral exterior surface connecting the inner end surface and the outer end surface, and (iv) a mounting surface configured to face to a mounting board and arranged perpendicular to the inner end surface, the outer end surface and the lateral exterior surface; and a terminal fitting attached to the flange, wherein:

the terminal fitting includes:

an engagement part having (i) a first portion in contact with the inner end surface, (ii) a second portion in contact with the outer end surface, and (iii) a third portion in contact with the lateral exterior surface, and a protrusion plate part connected to the engagement part;

the third portion extends between and connects the first portion and the second portion;

the engagement part and the flange are configured such that the first portion and the second portion apply a clamping force on the inner end surface and the outer end surface to affix the engagement part to the flange;

the protrusion plate part includes (i) a mounting part extending along the mounting surface and configured to be connected to the mounting board and (ii) a connection part extending along the lateral exterior surface between the mounting part and the engagement part; and the mounting part is connected to a lead end of the wire.

2. The coil device according to claim 1, wherein the protrusion plate part includes:

a wire connection surface to which a lead end of the wire is connected; and a main mounting surface (i) opposite to the wire connection surface and (ii) configured to be connected to the mounting board.

3. The coil device according to claim 2, wherein the protrusion plate part includes:

a mounting base part including the main mounting surface and configured to be parallel to the mounting board when the coil device is mounted on the mounting board; and a tip bending part at an end of the mounting base part and that overlaps the mounting base part in a direction perpendicular to the winding core axis, and the lead end of the wire is sandwiched between the mounting base part and the tip bending part.

4. The coil device according to claim 3, wherein the protrusion plate part includes a connection base part connecting the engagement part and the mounting base part.

5. The coil device according to claim 1, wherein the protrusion plate part includes a slit near the engagement part.

6. The coil device according to claim 5, wherein the terminal fitting is narrow at the slit.

7. The coil device according to claim 2, wherein the flange is partly contacted by a rear surface of the terminal fitting opposite to the main mounting surface.

8. The coil device according to claim 1, wherein:

the engagement part grips the flange by an elastic force generated by the first portion and the second portion, and the first portion and the second portion are disposed so that a gap decreases in distance between the first portion and the second portion towards tips of each respective first portion and second portion.

* * * * *